United States Patent
Rosenbaum et al.

(10) Patent No.: US 7,028,004 B2
(45) Date of Patent: Apr. 11, 2006

(54) METHOD FOR ORDERING AND CONSIGNING ITEMS

(75) Inventors: Walter Rosenbaum, Paris (FR); Karlheinz Reich, Radolfzell (DE)

(73) Assignee: Siemens Aktiengesellschaft, München (DE)

( * ) Notice: Subject to any disclaimer, the term of this patent is extended or adjusted under 35 U.S.C. 154(b) by 28 days.

(21) Appl. No.: 10/235,889

(22) Filed: Sep. 6, 2002

(65) Prior Publication Data

US 2003/0120556 A1 Jun. 26, 2003

Related U.S. Application Data

(63) Continuation of application No. PCT/DE01/01034, filed on Mar. 16, 2001.

(30) Foreign Application Priority Data

Mar. 20, 2000 (DE) ................................ 100 13 317

(51) Int. Cl.
*G06F 17/60* (2006.01)

(52) U.S. Cl. ........................................ 705/28; 700/216

(58) Field of Classification Search ................ 700/216, 700/219, 220, 221, 222, 223, 224, 226, 227; 705/22, 28

See application file for complete search history.

(56) References Cited

U.S. PATENT DOCUMENTS

| | | | |
|---|---|---|---|
| 4,734,858 A | | 3/1988 | Schlafly |
| 4,799,156 A | | 1/1989 | Shavit et al. |
| 5,038,283 A | * | 8/1991 | Caveney ...................... 705/28 |
| 5,040,132 A | * | 8/1991 | Schuricht et al. ........... 715/507 |
| 5,117,096 A | * | 5/1992 | Bauer et al. ................. 235/375 |
| 5,168,144 A | | 12/1992 | Hongu et al. |
| 5,315,508 A | * | 5/1994 | Bain et al. .................... 705/28 |
| 5,334,822 A | * | 8/1994 | Sanford ........................ 705/28 |
| 5,493,491 A | * | 2/1996 | Calcerano et al. ............ 705/28 |
| 5,544,468 A | * | 8/1996 | Harrison et al. .............. 53/390 |
| 5,712,789 A | * | 1/1998 | Radican ........................ 700/226 |
| 5,828,322 A | * | 10/1998 | Eberhard ..................... 340/988 |
| 5,831,714 A | * | 11/1998 | Yoshikawa ................... 355/40 |
| 5,860,068 A | | 1/1999 | Cook |
| 5,923,014 A | * | 7/1999 | Szymusiak et al. ......... 235/375 |
| 5,974,004 A | | 10/1999 | Dockes et al. |
| 5,974,401 A | * | 10/1999 | Enomoto et al. ............. 705/40 |
| 5,997,194 A | * | 12/1999 | Nunokawa et al. .... 400/120.01 |
| 6,055,516 A | * | 4/2000 | Johnson et al. ............... 705/27 |
| 6,148,291 A | * | 11/2000 | Radican ........................ 705/28 |
| 6,175,825 B1 | * | 1/2001 | Fruechtel ..................... 705/404 |
| 6,269,609 B1 | * | 8/2001 | Graushar et al. ............. 53/168 |
| 6,285,916 B1 | * | 9/2001 | Kadaba et al. ............... 700/222 |
| 6,317,648 B1 | * | 11/2001 | Sleep et al. .................. 700/216 |

(Continued)

OTHER PUBLICATIONS

White, Ron, How Computers Work Millennium Ed. Que Corporation, Sep. 1999.*
Derfler, Frank J. et al. How Networks Work, Millenium Ed., Que Corporation, Jan. 2000.*

*Primary Examiner*—Andrew J. Fischer
(74) *Attorney, Agent, or Firm*—Siemens AG; Jacob Eisenberg

(57) ABSTRACT

The present invention comprises a method for processing on-line orders wherein the on-seller is liberated from having to maintain cumbersome or uneconomical warehouse stocks. Herein, after an order is received from a customer, the on-line seller subcontracts for the item sought by the customer and sends out a printing order. Both subcontract and printing order include an identification key which is later used to associate printed materials and item, so as to facilitate special packing of the item with special materials associated with the on-line seller, and the forwarding of the finally packaged item to the customer.

9 Claims, 1 Drawing Sheet

U.S. PATENT DOCUMENTS 6,380,965 B1 * 4/2002 Sims et al. .................. 347/218
6,587,827 B1 * 7/2003 Hennig et al. ................. 705/1
6,619,868 B1 * 9/2003 Ishida ......................... 400/76
2002/0090240 A1 * 7/2002 Lively ......................... 400/76
2002/0113428 A1 * 8/2002 Phillips ....................... 283/62
2002/0188499 A1 * 12/2002 Jenkins et al ................. 705/10

* cited by examiner

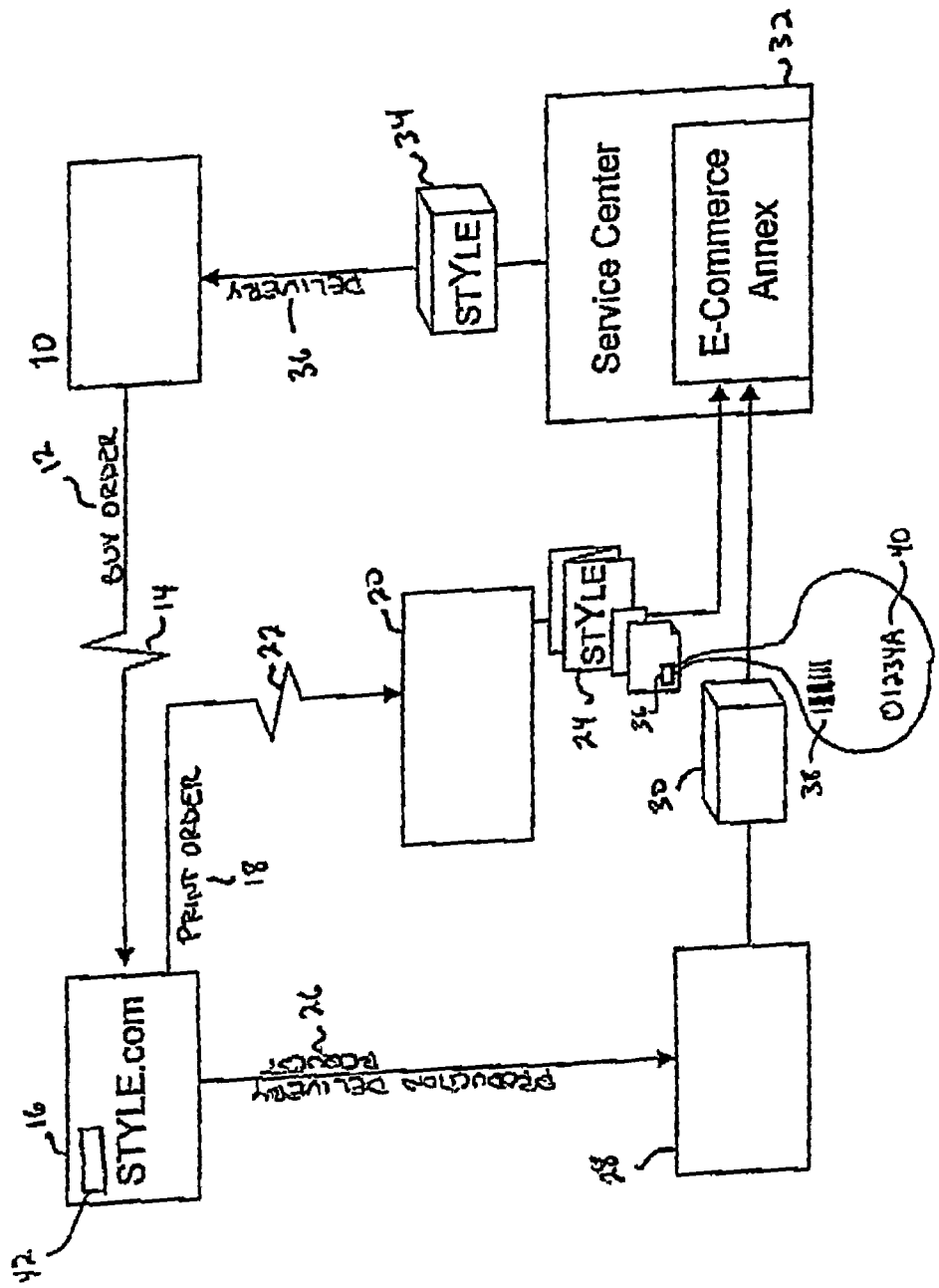

METHOD FOR ORDERING AND CONSIGNING ITEMS

CROSS REFERENCE TO RELATED APPLICATIONS

The present application is a continuation of International Application number PCT/DE01/01034, filed Mar. 16, 2001, and German Application number 100 13 317.7 filed 20, Mar. 2000, both of which are incorporated herein by reference.

BACKGROUND OF THE INVENTION

The present invention relates to a method for ordering and consigning goods or items, and more particularly, to a method for alleviating on-line sellers the need for constantly and fully stocked warehouses.

As is currently known in the art, an on-line seller or provider must maintain a large warehouse of constantly stocked items in order to timely satisfy incoming orders. In addition, there must exist a sufficient variety of goods. Likewise, such goods may require different storage support as well as have a limited lifespan. Upon receipt of an order, the goods are obtained from stock, associated with invoices, client information, cover letter and the like, packaged in appropriately seller distinct packing material, labeled and shipped.

To reduce the large stock of goods, the on-line seller turns to subcontracting the orders to manufactures or suppliers of particular items the on-line seller chooses not to stock. With such subcontracting arrangements, the goods ordered are packed in neutral containers with neutral packing. This is normally so in order for the subcontractor to effectively serve a variety of clientele. As such, the subcontractor must ship the goods to the on-line seller who must then repackage the items for shipping to the customer. Repackaging not only includes the item(s), but also an invoice, cover letter, information, seller specific packaging material, labels, etc. The repackaging cannot be realized with the subcontractor, if but for the fact that such repackaging is not neutral. Accordingly, a need exists in the art for a method to reduce the burden of warehousing on the on-line seller while still offering the seller the possibility for individualized service.

BRIEF SUMMARY OF THE INVENTION

An advantage of the present invention is directed to a method for ordering and consigning goods or items, via an on-line seller, which obviates the need for warehousing. A further advantage lay in addressing the individuality and special requirements of many on-line sellers so that the inventive method may be applied practically universally. A still further advantage lay in the reduction of processing steps required for preparing in on-line purchased item for shipping. These and other advantages are realized by the present invention which comprises a method by which the on-line seller may interact with other unrelated legal entities to provide the customer with a final product wherein the presentation is related to the item. While the term unrelated legal entities is used, it is understood by one skilled in the art that a commercial relationship may exist among the entities. As such, the on-line seller is free from having to maintain separate stocks of items for sale, packings and the like related to the item, and staff for bringing the items and packings together and ship the so packaged item to the customer. The instant method is directed to the processing of an on-line order for a good, said order received by an on-line seller from a customer, comprising the steps of: at said on-line seller, placing a printing order for a printed product with a printing center, said printing order comprising at least seller data, customer data, packing instruction, and identification key; at said on-line seller, placing a supply order for said good with a third party, said supply order including at least said identification key; at said printing center conveying said printed product to a service center at said third party, packaging said good and conveying packaged good to said service center; at said service center, associating said printed product and good in accordance with said identification key; at said service center, repackaging said good in accordance with said seller data, customer data and packing instruction; and forwarding repackaged good to said customer. In addition, in accordance with the present invention, the identification key is a bar code or human readable indicia.

BRIEF DESCRIPTION OF THE SEVERAL VIEWS OF THE DRAWINGS

The novel features and method steps believed characteristic of the invention are set out in the claims below. The invention itself, however, as well as other features and advantages thereof, are best understood by reference to the detailed description, which follows, when read in conjunction with the accompanying drawing, wherein:

FIG. 1 depicts a procedural course in schematic format.

DETAILED DESCRIPTION OF THE INVENTION

As depicted in FIG. 1, client or customer 10 places a purchase order 12, via his on-line computer internet access 14, with a first on-line seller 16 having the example name STYLE.com. The first notation for the on-line seller is added to distinguish the on-line seller from the other entities involved with this method. As can be imagined by one skilled in the art, more than one on-line seller may operate in concert. At the first on-line seller, the buying order is registered and stored via allocation of an identification key (not shown). Thereafter, the first on-line seller 16 places a printing order 18 with a second (with respect to the first on-line seller) printing center 20. The printing order may be on-line (22), by telephone, post and the like (not shown) provided that appropriate information is conveyed to the second printing center. The second printing center may include a fast color laser printer, networked computers, electronic communications and appropriate staff to facilitate the receipt of orders, printing and forwarding of same.

Such appropriate information includes: on-line seller data, customer data, item data, packaging requirements, special instructions, and the like. This information, along wit an identification key are included in the printing order from the first on-line seller 16. The identification key is used by the present method to identify an order and facilitate additional steps identified below. The first on-line seller data may include: seller name and address, seller cover letter to customer, seller information such as advertisements, informationals, and the like, company logo(s), company color(s), and the like. The customer data may include: customer name and address, customer special requests, and the like. The item data may include: item identification, item special assembly, item special handling, other instructions and the like. The packaging requirements may include: special wrapping specific to an on-line seller, customer, item, situation (e.g. holiday); special handling specific to the handling of the item, delivery, on-line seller, customer etc; special assemble of the item, package, etc.; special routing for the package, etc. The special instructions may include any additional information associated with the handling and processing of the packaged good as well as associating the printing order and good as discussed below. The above is depicted by way of example with printed materials 24.

At about the same time as the printing order is placed, so too is the subcontracting order. Namely, if the first on-line seller lacks sufficient stock or elects, a production delivery request 26 is made with an appropriate $3^{rd}$ party such as a third manufacturer or third supplier 28 to manufacture or otherwise provide a select number of particular items (order). The order is filled by the third manufacture or third supplier 28, packaged neutrally 30 and forwarded to a fourth service center 32. The identification key 36 provided by the first on-line seller in order 26 is included. Printed materials 24 is also forwarded to the fourth service center 32 by the second printing center, the printing materials being the product of the printing order 18. The fourth service center 32 may include an e-commerce annex which may receive and service e-commerce related orders.

At the fourth service center, the printing is matched with the package 30 via the common identification key. The package may be repackaged if the first on-line seller 16 requested special packing or the like. Special labels and other special instructions may follow. Likewise, some additional processing may be undertaken as may be required by the processing of individual items. The matched, possibly repackaged, package 34, may now include the name of the on-line seller (as depicted) and is delivered 36 directly to the customer 10 from the fourth service center 32.

The identification key 36 may comprise a bar code 38 or human readable code 40 that is printed or otherwise affixed to the printing and subcontracting order. This effects automated measures of matching the package 30 with priming 24, via the use of bar code scanners, optical scanner and the like. Alternatively, human readable indicia may be used so as to effect manual handling of the package and printing. Of course, a mixture is possible an envisioned by the skilled artisan.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for processing an on-line order, comprising:
   receiving an order for an item at a first on-line seller;
   placing a printing order for a printed product with a second printing center, said printing order and printed product functionally related to said item;
   conveying said printed product from said second printing center to a third service center;
   supplying said item at a fourth supplier and directing said item from said fourth supplier to said third service center;
   associating said printed product and said item and repackaging said item using said printing product at said third service center;
   forwarding repackaged item from said third service center to a customer; and
   wherein said first on-line seller, said second printing center, said fourth supplier and said third service center are unrelated separate legal entities.

2. The method according to claim 1, further comprising the steps of:
   generating an identification key at said first on-line seller, said identification key associated with said item;
   forwarding said identification key from said first on-line seller to said second printing center and said third supplier; and
   forwarding said identification key from said second printing center to said fourth service center and from said third supplier to said fourth service center.

3. The method according to claim 1, wherein said identification key is human readable indicia.

4. The method according to claim 1, wherein said printing order further comprises a cover letter from said on-line seller to said customer and informationals regarding said seller.

5. The method according to claim 1, wherein said seller data includes at least one of: seller name and address; seller cover letter to customer; seller iuformation such as advertisements; company logo; and company color.

6. The method according to claim 1, wherein said customer data includes at least one of: customer name ad address; and customer special requests.

7. The method according to claim 1, wherein said item data includes at least one of item identification; item special assembly; and item special handling.

8. The method according to claim 1, wherein said packaging requirements includes at least one of: special wrapping specific to on-line seller, customer, item, or situation; special handling specific to the handling of the item, delivery, on-line seller, or customer; special assemble of the item, or package; and special routing for the package.

9. The method according to claim 2, wherein said identification code is humanly readable.

* * * * *

UNITED STATES PATENT AND TRADEMARK OFFICE
CERTIFICATE OF CORRECTION

| | | |
|---|---|---|
| PATENT NO. | : 7,028,004 B2 | Page 1 of 1 |
| APPLICATION NO. | : 10/235889 | |
| DATED | : April 11, 2006 | |
| INVENTOR(S) | : Walter Rosenbau and Karlheinz Reich | |

It is certified that error appears in the above-identified patent and that said Letters Patent is hereby corrected as shown below:

Column 4, line 2, "third" should be changed to --fourth--.

Column 4, line 3, "fourth" should be changed to --third--.

Column 4, line 4, "fourth" should be changed to --third-- and "third" should be changed to --fourth--.

Column 4, line 7, "third" should be changed to --fourth--.

Column 4, line 9, "third" should be changed to --fourth--.

Column 4, line 12, "fourth" should be changed to --third-- and "third" should be changed to --fourth--.

Signed and Sealed this

Eighteenth Day of May, 2010

David J. Kappos
*Director of the United States Patent and Trademark Office*